United States Patent
Graves

(10) Patent No.: US 7,039,318 B2
(45) Date of Patent: May 2, 2006

(54) DISPERSION DISCRIMINATION AND COMPENSATION SYSTEM AND OPTICAL SWITCH FOR USE THEREWITH

(75) Inventor: Alan F. Graves, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 698 days.

(21) Appl. No.: 09/965,810

(22) Filed: Oct. 1, 2001

(65) Prior Publication Data
US 2002/0018265 A1  Feb. 14, 2002

Related U.S. Application Data

(60) Provisional application No. 60/207,292, filed on May 30, 2000.

(51) Int. Cl.
*H04J 4/00* (2006.01)
*H04J 14/00* (2006.01)
*H04J 14/02* (2006.01)

(52) U.S. Cl. .......................................... 398/81; 398/45
(58) Field of Classification Search ................ 398/81, 398/93, 45, 29, 147, 79, 158, 50, 56
See application file for complete search history.

(56) References Cited

U.S. PATENT DOCUMENTS

| | | | |
|---|---|---|---|
| 6,330,383 B1 * | 12/2001 | Cai et al. | 385/37 |
| 6,370,300 B1 * | 4/2002 | Eggleton et al. | 385/37 |
| 6,445,841 B1 * | 9/2002 | Gloeckner et al. | 385/17 |
| 6,501,580 B1 * | 12/2002 | Ishikawa et al. | 359/161 |
| 6,515,779 B1 * | 2/2003 | Fee | 359/161 |
| 6,625,341 B1 * | 9/2003 | Novotny | 385/18 |
| 2001/0008452 A1 * | 7/2001 | Sugihara et al. | 359/124 |
| 2002/0191247 A1 * | 12/2002 | Lu et al. | 359/124 |

OTHER PUBLICATIONS

Polarization Mode Dispersion Tutorial; Datasheet [online ] Web ProForums retrieved on Jun. 26, 2001; Retrieved from the Internet: <http://www.iec.org/tutorials/polar_mode/index.html>.

* cited by examiner

*Primary Examiner*—Jason Chan
*Assistant Examiner*—Quan-Zhen Wang
(74) *Attorney, Agent, or Firm*—Withrow & Terranova, PLLC

(57) ABSTRACT

A variable dispersion compensation to a signal for compensating dispersion present in an optical signal. The invention can be embodied in a dispersion discrimination and compensation system comprising a feedback loop for regulating an amount of dispersion compensation applied by a controlable anti-dispersive element (CADE) to an incoming optical signal. To that effect, the feedback loop comprises a dispersion discriminator for accepting a portion of a signal outgoing form the CADE and to provide a measure of a dispersion characteristic to a processor which controls the amount of dispersion compensation applied by the CADE. The dispersion discrimination and compensation system can be stand-alone or integrated into an optical switch. Furthermore, dispersion compensation can be provided to multichannel optical signals or to partially or totally demultiplexed optical signals.

23 Claims, 8 Drawing Sheets

DISPERSION DISCRIMINATION AND COMPENSATION SYSTEM AND OPTICAL SWITCH FOR USE THEREWITH

CROSS-REFERENCES TO RELATED APPLICATIONS

The present application is related in subject matter to co-pending U.S. patent applications Ser. No. 09/859,544 to Graves et al., entitled "Optical Switch with Connection Verification", filed on May 18, 2001; Ser. No. 09/742,232 to Van Schyndel, entitled "Gain Determination for Correlation Processes", filed on Dec. 22, 2000; Ser. No. 09/511,065 to Graves et al., entitled "Switch for Optical Signals", filed on Feb. 23, 2000; Ser. No.60/207,292 to Graves et al., entitled "Optical Switch with Connection Verification", filed on May 30, 2000; Ser. No. 09/842,236 to Graves, entitled "Chromatic Dispersion Discriminator", filed on Apr. 26, 2001; and Ser. No. 09/580,495 to Graves et al., entitled "Optical Switch with Power Equalization", filed on May 30, 2000, all assigned to the assignee of the present invention and hereby incorporated by reference herein in their entirety.

FIELD OF THE INVENTION

The present invention relates generally to systems used for switching optical wavelength channels in a wavelength division multiplexed (WDM) network and, more particularly, to optical switches and cross-connects which are required to be equipped with dispersion discrimination and compensation functionality.

BACKGROUND OF THE INVENTION

Optical waveguides provide a maximum velocity of propagation for light at a single wavelength or frequency. For all other wavelengths, they provide a slightly lower velocity of propagation. This lower velocity manifests itself as a variable delay through a long optical waveguide path, where the delay depends on the light frequency or wavelength. The point at which maximum velocity is achieved depends on the design and material composition of the fiber.

Chromatic dispersion is defined as the derivative of the propagation delay with respect to the frequency of light propagated through an optical waveguide. It is to be noted that other types of dispersion exist, such as polarization dispersion for which the two polarizations (horizontal and vertical) of light are propagated at two different velocities in an optical waveguide. In the following, the term "dispersion" will refer to chromatic dispersion except where otherwise noted.

In an optical telecommunication system, the frequency dependence of the delay may be problematic. Specifically, any given optical carrier that is modulated with data contains information-related side-band frequencies differing slightly from the carrier's frequency. Since in such telecommunication systems the data is typically amplitude modulated in the optical carrier, two side-bands (an upper and a lower side-band) are present for each carrier frequency. If the carrier frequency is not close to the frequency corresponding to maximal propagation velocity, the delay experienced by the upper side-band will not be identical to the delay experienced by the lower side-band. Therefore, the upper and lower side-bands will be out of phase and can interfere destructively to reduce the amplitude of the side-band components at the receiver. Eventually, if the delay between the two side-bands is large enough, sideband components at some frequencies will be totally cancelled. Those skilled in the art will appreciate that such modifications to a signal may lead to information loss if they are not corrected. An optical signal is said to have positive dispersion polarity if the upper sideband components are delayed with respect to lower sideband components and negative dispersion polarity in the opposite situation.

Correction of dispersion in an optical transmission system is achieved by ensuring that the system taken as a whole operates over an optical path with a minimum propagation velocity differential at optical frequencies around the carrier frequency of the signal being propagated. This allows the upper and lower side-bands to experience the same propagation delays, which avoids the destructive interference described above.

In a conventional optical system, signals are propagated over multiple spans before a substantial, expensive and approximate banded dispersion compensator is deployed. In such conventional optical systems for transmitting a WDM signal comprising multiple carriers across a transmission path, WDM signals are first band-demultiplexed, which means that the incoming WDM signal is split into several other WDM signals, each having a bandwidth smaller than the bandwidth of the incoming signal and containing a lesser number of carriers. Then, each of the demultiplexed WDM signals is fed to a separate dispersion compensation system, such as those described herein below, before being fed to a receiver.

A conventional dispersion compensation system may consist of a compensating length of fiber which is added to a transmission path. The length and properties of the compensating fiber are chosen so that they have an equal but opposite effect on the dispersion of a signal propagated through an optical fiber. One disadvantage of this approach is the reduction in the width of the "low dispersion" frequency window, which comprises those frequencies that are close to the frequency for which the propagation velocity is maximal. Therefore, the "low dispersion" window includes the frequencies for which dispersion does not deform substantially a signal having a carrier frequency in this window. Those skilled in the art will appreciate that having smaller "low dispersion" window dispersion compensation devices disadvantageously leads to needing more of these devices to correct dispersion in a given signal.

Another conventional dispersion compensation system consists in having fiber transmission paths composed of a concatenated mixture of fiber types. If an appropriate choice of fiber for which dispersion characteristics compensate or partially compensate each other is used, there is no need for a separate dispersion compensator.

Those skilled in the art will appreciate that this solution is acceptable if all of the optical carriers in a given WDM stream have traversed the same optical path and have suffered substantially the same amount of dispersion. However, in a photonically switched network this is not the case. Adjacent wavelengths in an output WDM stream may have completely different ancestries and hence impairments. Therefore, a conventional approach cannot be used to correct dispersion in photonically switched networks, unless rigorous compensation is carried out on every span between switches, and even then the errors in that compensation will concatenate across the network.

SUMMARY OF THE INVENTION

The present invention is directed to providing variable dispersion compensation to a signal. The invention can be embodied in a dispersion discrimination and compensation system including a feedback loop for regulating an amount of dispersion compensation applied by a controllable anti-dispersive element (CADE) to an incoming optical signal. To that effect, the feedback loop includes a dispersion discriminator for accepting a portion of a signal outgoing from the CADE and to provide a measure of a dispersion characteristic to a processor which controls the amount of dispersion compensation applied by the CADE.

In this way, the amount of dispersion compensation applied to a signal can be varied according to the dispersion present in the signal. This becomes advantageous in a photonically switched network because it provides a tendency for the residual dispersion error to remain at the dispersion discriminator sensitivity threshold, irrespective of the number of optical links concatenated. Secondly, integration with an optical switch provides a reduction in complexity and cost for a dispersion-compensated optical network. Thirdly, the invention is readily adaptable to provide dispersion compensation on a per-channel basis.

In some embodiments of the invention, dispersion compensation is provided for each multiplexed input optical signal at the input to the switch. In other embodiments, dispersion compensation is provided to partly or totally demultiplexed optical signals, either prior or subsequently to performing the switching action inside the switch. In the latter case, connection map information is provided to the processor to associate output signals to corresponding input signals.

In some embodiments of the invention, the number of components needed for the dispersion compensating switch is reduced by using a scanning front end already present in the switch for other purposes to select a single data channel to provide to the dispersion discriminator in a plurality of multi-channel optical signals.

In other embodiments of the invention, the dispersion of the signal to be compensated is evaluated prior and subsequently to its processing by the CADE, thereby providing help in diagnosing a possible cause of failure to appropriately compensate the dispersion. For example, if the signal incoming to the CADE has a compensation too large to be compensated by the CADE, there is no need to issue a service call for maintenance of the CADE.

According to a broad aspect, the invention may be summarized as a dispersion discrimination and compensation system, including:
a) an anti-dispersive element having an input for receiving a first optical signal and an output for providing a second optical signal, the anti-dispersive element being adapted to apply dispersion compensation to the first optical signal in response to receipt of a first control signal, thereby to produce the second optical signal;
b) a dispersion discriminator connected to the anti-dispersive element and adapted to determine a dispersion characteristic of the second optical signal, the dispersion discriminator being further adapted to generate a second control signal indicative of the dispersion characteristic of the second optical signal; and
c) a processor connected to the dispersion discriminator and to the anti-dispersive element, the processor being adapted to generate the first control signal as a function of the second control signal, thereby to exert feedback control of the dispersion compensation applied to the first optical signal by the anti-dispersive element.

In some embodiments of the present invention, the system may further include an optical splitter connected to the dispersion discriminator and to the output of the anti-dispersive element, for tapping the second optical signal and feeding it to the dispersion discriminator.

In some embodiments, the dispersion compensated by the system may be chromatic dispersion, or it may be polarization dispersion. Furthermore, in some embodiments, the dispersion characteristic may be magnitude or polarity.

In further embodiments, the invention may be summarized broadly as a dispersion discrimination and compensation system, including:
a) a plurality of anti-dispersive elements, each having an input for receiving a respective first multi-channel optical signal and an output for providing a respective second multi-channel optical signal, each of the anti-dispersive element being adapted to apply dispersion compensation to the respective first multi-channel optical signal in response to receipt of a respective first control signal, thereby to produce the respective second multi-channel optical signal;
b) a front end selector (FES) having an FES output and also having a plurality of FES inputs each connected to the output of a respective one of the plurality of anti-dispersive elements, each FES input accepting a respective one of the plurality of second multi-channel optical signals, the FES being adapted to select an FES input from the plurality of FES inputs, to select a single channel in the optical signal present at the selected FES input and to provide the selected channel to the FES output;
c) a dispersion discriminator connected to the FES output and adapted to determine a dispersion characteristic of the optical signal present at the FES output, the dispersion discriminator being further adapted to generate a second control signal indicative of the dispersion characteristic of the optical signal present at the FES output; and
d) a processor connected to the dispersion discriminator and to the plurality of anti-dispersive elements, the processor being adapted to generate, as a function of the second control signal, the first control signal for the anti-dispersive element whose output is connected to the selected FES input, thereby to exert feedback control of the dispersion compensation applied by that anti-dispersive element.

The invention may also be broadly summarized as a method of compensating for dispersion present in a first optical signal. The method includes applying an amount of dispersion compensation to the first optical signal, thereby to produce a second optical signal, determining a dispersion characteristic of the second optical signal and, on the basis of the determined dispersion characteristic of the second optical signal, regulating the amount of dispersion compensation applied to the first optical signal.

The invention may further be broadly summarized as a switch that includes a dispersion discrimination and compensation system as described above. The switch may further include a power spectrum equalization subsystem for equalizing the intensity of optical signals outgoing from the switch. Also, the switch may include a path integrity block for monitoring a swithching function of the switch.

These and other aspects and features of the present invention will now become apparent to those of ordinary skill in the art upon review of the accompanying description of specific embodiments of the invention in conjunction with the following drawings.

DETAILED DESCRIPTION OF THE PREFERRED EMBODIMENTS

Figure 1A:
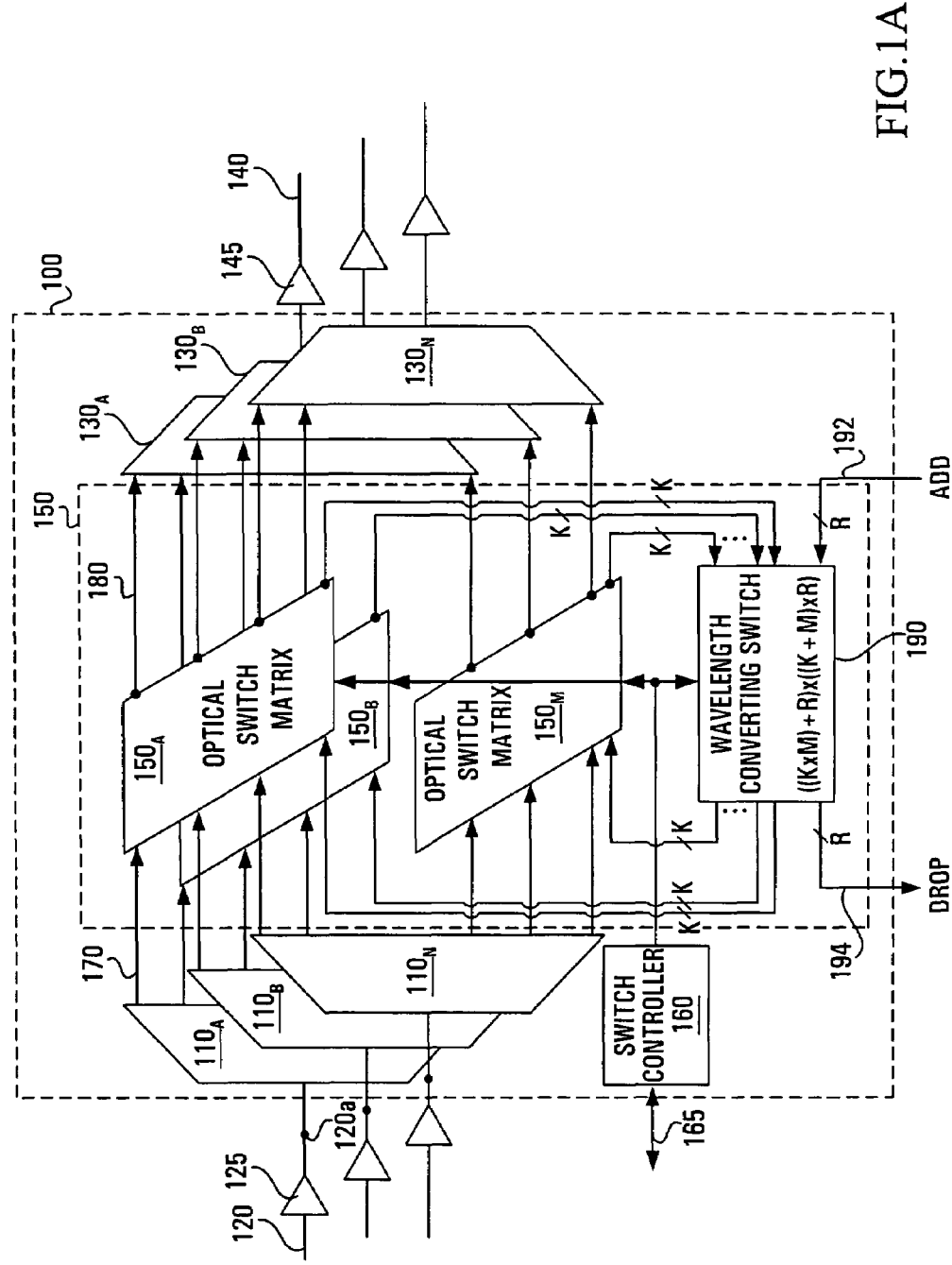
FIG. 1A shows a photonic switch in block diagram form.

In a first embodiment, the present invention provides a Dispersion Discrimination and Compensation (DDC) subsystem that can be added to a photonic switch. By way of a non-limiting example, FIG. 1 shows a conventional switch that can be used in conjunction with the present invention. The conventional switch depicted in FIG. 1 will be briefly described. It is more fully described in above-referenced co-pending U.S. patent application Ser. No. 09/511,065.

The photonic switch 100 typically comprises N individual M-output wavelength division demultiplexing (WDD) devices $110_A$–$110_N$, where each WDD device is associated with a respective one of N input optical fibers 120 connected to a respective set of N amplifiers 125. The photonic switch 100 also comprises N individual M-input wavelength division multiplexing (WDM) devices $130_A$–$130_N$, one WDM device for each of N output optical fibers 140 connected to a respective set of N amplifiers 145.

The photonic switch 100 also comprises a photonic switch core 150 connected between the WDD devices $110_A$–$110_N$ and the WDM devices $130_A$–$130_N$ and a switch controller 160 connected to the photonic switch core 150.

On an input side of the photonic switch 100, each of the N WDD devices $110_A$–$110_N$ accepts a respective input WDM signal on a respective one of the input optical fibers 120. Each of the N WDD devices $110_A$–$110_N$ then separates the respective input WDM signal on a per-wavelength basis into a plurality (M) of input individual optical carrier signals which are provided to an input side of the photonic switch core 150 along a respective plurality (M) of demuxed input optical paths 170, which may consist of optical fibers, silica waveguides or other optical transmission media.

The photonic switch core 150 switches the input individual optical carrier signals, thereby producing a plurality of switched individual optical carrier signals which are carried out of the photonic switch core 150 by a plurality of demuxed switched optical paths 180. The switch controller 160 generates a connection map under external or locally generated stimulus, which connection map is provided to the photonic switch core 150 and defines the desired map of the optical channels from the input side to the output side of the photonic switch core 150. External stimulus may be provided via a control link 165.

At the output of the photonic switch core 150, each of the WDM devices $130_A$–$130_N$ receives a respective set of demuxed switched optical paths 180 and combines the switched individual optical carrier signals thereon into a single respective WDM signal that exits the photonic switch 100 along a respective one of the output optical fibers 140.

In the illustrated embodiment, the photonic switch core 150 comprises a wavelength converting switch 190 and M optical switch matrices $150_A$–$150_M$, one for each of the M optical wavelengths in the system. Each optical switch matrix has a set number of input ports and output ports and can be a Micro-Electro-Mechanical System (MEMS) device as described in "Free-Space Micromachined Optical-Switching Technologies and Architectures" by Lih Y. Lin of AT&T Labs-Research during OFC99 Session W14-1 on Feb. 24, 1999. This article is incorporated by reference herein. Such a MEMS device comprises a set of mirrors that are arranged in geometrical relationship with the input and output ports such that incoming light from any input port can be diverted to any output port by erecting an appropriate one of the mirrors under control of the switch controller 160.

In FIG. 1, each of the optical switch matrices $150_A$–$150_M$ has a total of K+N input ports and K+N output ports where, it is recalled, N is the number of WDD devices $110_A$–$110_N$ and WDM devices $130_A$–$130_N$. For each of the optical switch matrices $150_A$–$150_M$, each of the N input ports will be connected to the like-wavelength output port of a respective one of the WDD devices $110_A$–$110_N$, while each of the N output ports will be connected to the like-wavelength input port of a respective one of the WDM devices $130_A$–$130_N$.

It is thus noted that each of the optical switch matrices $150_A$–$150_M$ has K more input ports and K more output ports than are required to switch the N corresponding input individual optical carrier signals (one of which arrives from each of the N WDD devices $110_A$–$110_N$). These additional ports are connected to the wavelength converting switch 190, with two important consequences. Firstly, optical carrier signals arriving on demuxed input optical paths 170 can be redirected towards the wavelength converting switch 190. Secondly, optical carrier signals arriving from the wavelength converting switch 190 can be output onto one of the demuxed switched optical paths 180.

The net result is that a signal on an individual optical carrier is allowed to change wavelengths on its way through the photonic switch 100 by a process which involves optical reception, opto-electronic conversion, electrical switching of the converted electrical signal to an optical source at a desired wavelength and modulation of that source's optical output. The wavelength conversion process is particularly useful when an input wavelength is already in use along the fiber path leading to a destination WDM device.

It should further be noted that the wavelength converting switch 190 also accepts a plurality of "add carriers" on a plurality (R) of add paths 192 and outputs a plurality of "drop carriers" on a plurality (R) of drop paths 194. Thus, it is seen that the wavelength converting switch 190 has a total of ((K×M)+R) inputs and a like number of outputs. Structurally, the wavelength converting switch 190 comprises a set of ((K×M)+R) electrical-to-optical converters, an electrical switch and a set of ((K×M)+R) optical-to-electrical converters that collectively function as a miniature version of an electrical switch for optical signals.

In operation, the photonic switch 100 of FIG. 1 provides purely optical switching at the optical switch matrices 150$_A$–150$_N$ and wavelength conversion (most commonly through the use of electrical switching) at the wavelength converting switch 190. Control of which input individual optical carrier signals are redirected into the wavelength converting switch 190 is provided by the switch controller 160. The switch controller 160 also provides control of the switching executed inside the wavelength converting switch 190.

With the assistance of network-level control of the wavelengths used by the various sources in the network, it is usually possible to ensure that most wavelengths can transit directly across most nodes in the network without wavelength conversion, hence ensuring that the majority of optical carriers will be sent along the desired output optical fiber 140 directly by the optical switch matrices 150$_A$–150$_M$ without involving the wavelength converting switch 190. As a result, it is usually possible to achieve a minimal blocking probability at the photonic switch 100 by selecting a relatively small value for K, i.e., by keeping most of the switching entirely in the optical domain.

Figure 1B:
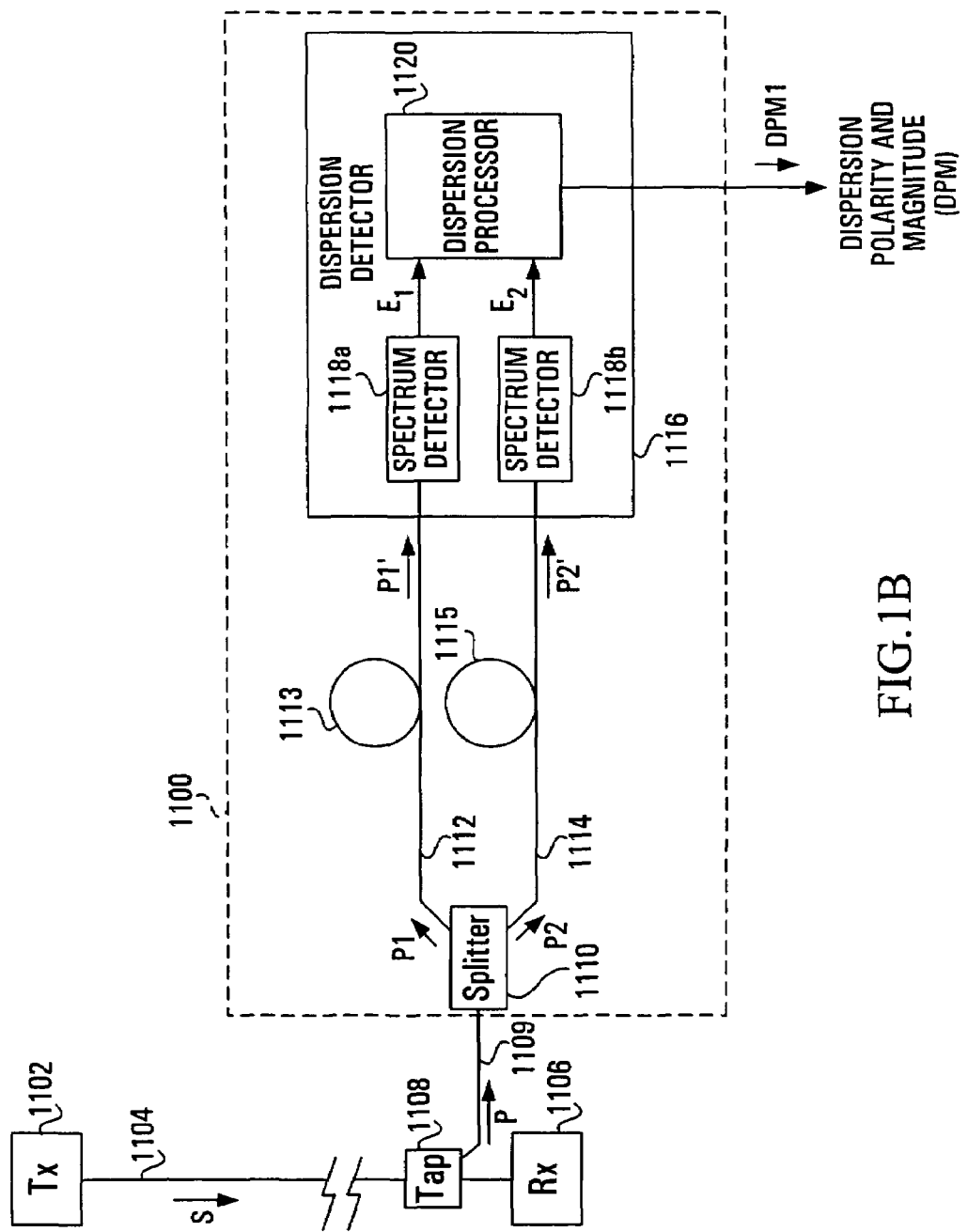
FIG. 1B shows a chromatic dispersion discriminator in block diagram form.

An embodiment of the present invention utilizes a dispersion discriminator. By way of a non-limiting example, FIG. 1B shows a known dispersion discriminator that is suitable for use in the present invention. An example of a dispersion discriminator will now be described briefly with reference to FIG. 1B. It is more fully described in above-referenced co-pending U.S. patent application Ser. No. 09/842,236.

In a typical application scenario, a dispersion discriminator 1100 is coupled to part of an optical transmission system (1102, 1104, 1108, 1106) and measures the dispersion caused by at least a part of that system. For example, an optical transmitter 1102 transmits an optical signal S over a transmission path 1104 which is terminated by an optical receiver 1106. An optical tap 1108 coupled to the link 1106 taps a portion P of the signal S and routes this portion P over a short optical fiber 1109 to the dispersion discriminator 1100. As is now described, the DD 1100 operates by dividing the signal into two equal magnitude portions and adding additional dispersion, ideally of equal but opposite sign, to each of the portions. Specifically, the portion P is received by the discriminator 1100 which includes an optical splitter 1110 coupled to the fiber 1109 at its input and, to one end of a positive dispersion leg 1112 at one of its outputs and to one end of a negative dispersion leg 1114 at its other output. The splitter 1110 divides the signal P into two portions represented by signals P1 and P2. The signal P1 traverses the positive dispersion leg 1112, which comprises a coil of fiber 1113 or other positive dispersion medium or construct, which exhibits positive dispersion at the optical frequency/wavelength of interest, and the signal P2 traverses the negative dispersion leg 1114, which comprises a coil of fiber 1115 or other negative dispersion medium or construct, which exhibits negative dispersion at the optical frequency/wavelength of interest. The two signals P1' and P2' at the ends of these coils of fiber are received by a dispersion detector 1116 that is coupled to the positive 1112 and negative 1114 dispersion legs at their other ends. Thus the discriminator 1100 is able to determine the phase shift of the signal S after propagating along the transmission link 1104 by adding a small amount of positive and negative dispersion to parts P1 and P2 of the signal S, via the positive 1112 and negative 1114 dispersion legs, and examining the impact on the signals P1' and P2' received at the dispersion detector 1116.

The signals P1' and P2' at the ends of these fibers are then analyzed by passing them through two conventional spectrum detectors 1118a and 1118b coupled to the legs 1112 and 1114. The spectrum detectors 1118a and 1118b may include conventional opto-electronic receivers based on PIN-diodes, APD-diodes or similar components. A processor 1120 coupled to the detectors 1118a and 1118b analyzes the respective signals E1, E2 from the detectors 1118a and 1118b, determines the polarity and magnitude of dispersion in the signal S and outputs the resulting determination in a dispersion polarity and magnitude (DPM) output signal DPM1. The output signal DPM1 gives an indication of polarity and magnitude of dispersion in the optical signal input to the dispersion discriminator, and this indication can be used by a dispersion compensator for compensating the dispersion.

In a "balanced" (i.e. no transmission dispersion) case these two detectors 1118a and 1118b will show nominally identical outputs. However, if the signal S has undergone dispersion from propagating along the transmission link 1104, the detector 1118a or 1118b on the discriminator leg 1112 or 1114 with the same dispersion polarity will show a signal degradation (i.e. increased high frequency loss) whilst the detector 1118b or 1118a on the other leg 1114 or 1112 will show a relative improvement. In a balanced zero dispersion case, the discriminator will show a high frequency roll-off due to its internal dispersion, necessary for the discriminator to work.

Figure 2:
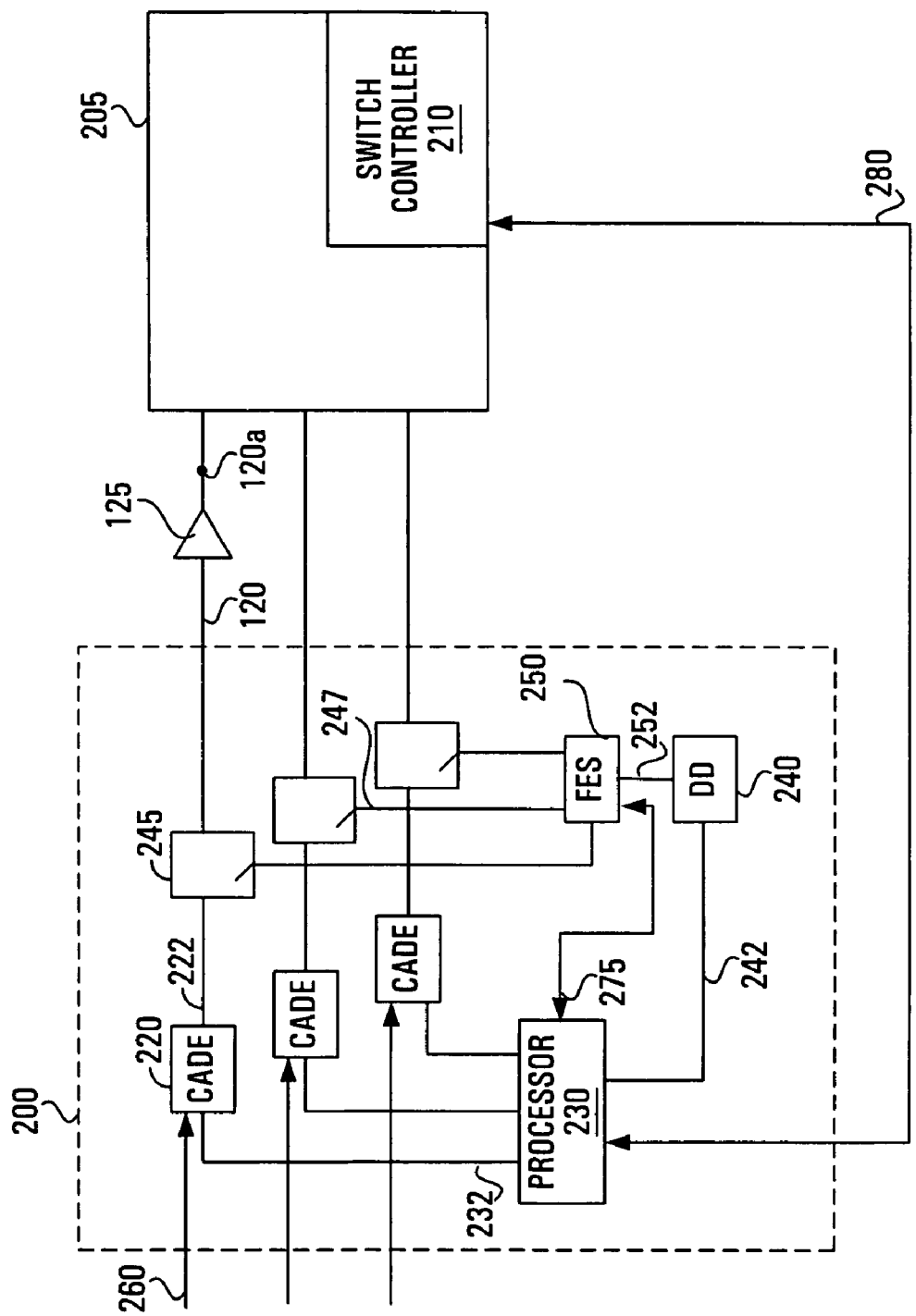
FIG. 2 is a block diagram of a dispersion discrimination and compensation subsystem connected to a photonic switch, in accordance with an embodiment of the present invention.

FIG. 2 shows a DDC subsystem 200 according to an embodiment of the present invention. The DDC subsystem 200 may be used with a photonic switch 205 such as the photonic switch 100 of FIG. 1. DDC subsystem 200 comprises a set of N Controllable Anti-Dispersive Elements (CADEs) 220, a Front End Selector (FES) 250 a Dispersion Discriminator (DD) 240 and a processor 230. The detailed internal structure of CADEs 220, FES 250, DD 240 and processor 230 is not critical to the present invention.

In the illustrated embodiment, there is a single processor 230, a single DD 240 and a single FES 250 present in DDC subsystem 200. However, it should be appreciated that a plurality of FESs, DDs and processors could be used if advantageous for a particular application.

As their name implies, CADEs 220 are responsible for applying dispersion compensation to WDM signals, the amount of dispersion compensation applied being adjustable. The amount of dispersion compensation applied is regulated by processor 230, the regulation information being supplied to CADEs 220 by a set of control links 232.

The principle of operation of the CADEs 220 is to introduce a variable controlled amount of opposite polarity dispersion to the dispersed signal to be compensated, under control of the Dispersion Discriminator 240. Thus, the dispersion on an incoming signal is not actually removed, but rather its effects are cancelled by adding an equal amount of dispersion of the opposite polarity.

One way of providing variable dispersion compensation involves using an optical switching module, with one input of the switching module accepting a signal to be compensated and one output outputting a compensated signal. The other outputs of the switching module are connected to the other inputs of the module with optical fibers having various dispersive properties.

Then, using appropriate routing of the signal to be compensated through the optical fibers, variable dispersion compensation can be provided. CADEs such as those just described usually provide only one or two control parameters. Therefore, if many signals having many different carrier frequencies are to be compensated, different implementations of the CADE may be used.

The lengths of dispersive fiber may vary and may be concatenatable in series to build up the degree of applied compensation. By using four fiber lengths in the ratio of $1:2:2^2:2^3$ sixteen compensation levels can be achieved with the use of a 4×4 switch, by appropriate series combinations.

Regardless of the implementation of the CADEs 220, the compensated signals outgoing from CADEs 220 are fed to photonic switch 205 through optical input fibers 120. Photonic switch 205 can be the photonic switch 100 of FIG. 1. However, those skilled in the art will appreciate that any photonic switch 205 can be used in replacement of photonic switch 100 of FIG. 1

Parts of the outgoing signals from CADEs 220 are tapped at a plurality (N) of directional couplers 245 (also referred to as optical splitters) and fed through optical fibers 247 to FES 250. Such directional couplers are well known in the art and any appropriate directional coupler can be used. Preferably, but not obligatorily, directional couplers 245 each tap 10 to 20 percent of the power of the corresponding outgoing signal from CADEs 220 so that the power loss from the untapped part of the outgoing signal is minimized while enough power is tapped for DD 240 to function properly. On FIG. 2, directional couplers 245 tap signals before amplifiers 125. However, directional couplers 245 could also be located at reference point 120A, after amplifiers 125.

FES 250 is used to select a single optical fiber from the set of N optical fibers 247 (which transmit WDM signals) and, for the selected optical fiber, to select a single carrier frequency, thereby selecting a single optical data channel to be fed to DD 240 through optical fiber 252. One possible embodiment of the FES 250 includes a first optical switching stage with a plurality of input ports, one for each of the N WDM signals tapped by the splitters 245. The first optical switching stage may be embodied by an optical switch matrix, such as a MEMS device as described in the above-referenced article by Lih Y. Lin. A control signal may be supplied to the first optical switching stage, causing the multi-carrier signal of a selected of one of the fibers 247 to appear at an output of the first optical switching stage. This signal may then be fed to a WDD device, whose outputs each carry a distinct one of M single-carrier optical signals and are connected to a second optical switching stage. A control signal may be supplied to the second optical switching stage, causing the single-carrier signal of a selected of one of the carriers (on the selected one of the fibers 247) to appear at an output of the second optical switching stage. The output of the second optical switching stage is provided to the dispersion discriminator (DD) 240 via optical fiber 252. Various other embodiments of the FES are possible and are within the scope of the present invention. As an example, other embodiments may be found in above-referenced U.S. patent application Ser. No. 60/207,292 to Graves, entitled "Optical Switch with Connection Verification", filed on May 30, 2000.

DD 240 is used to determine the polarity of the residual dispersion of the optical signal carried by optical fiber 252. DD 240 can be, but is not limited to, DD 1100 shown on FIG. 1B and previously described. It should be noted that a given DD 240 has the capacity to detect dispersion having at least a certain minimal magnitude. If the dispersion has a magnitude below this minimal magnitude, the optical signal is considered dispersionless by DD 240, even if in reality the optical signal presents some residual dispersion.

This minimal dispersion detection magnitude is termed the "discrimination sensitivity" of the discriminator and should be below the level of residual dispersion that would present a problem to the transmission of an optical signal. In the case of the dispersion discriminator described briefly earlier and described in greater detail in above-referenced co-pending U.S. patent application Ser. No. 09/842,236, the discrimination sensitivity in the case of incrementally dispersive discriminator arms of 4.8 ps/GHz, was modeled as +/−0.2 ps/GHz. This level of sensitivity corresponds to a phase error of ~4 ps, or about 28.8 degrees for a 20 GHz sideband in a 40 Gb/s system (giving a 0.57 dB roll-off); alternatively, in a 10 Gb/s system, this level of sensitivity corresponds to a phase error of ~1 ps, or 1.8 degrees for a 5 GHz sideband (giving a 0.002 dB roll-off). This is therefore an example of a discriminator that would be suitable for use at speeds up to at least 10–40 Gb/s.

The measured polarity of the dispersion, and optionally its magnitude, in the optical signal fed to DD 240 are transmitted to processor 230 through communication link 242. Processor 230 controls CADEs 220, by changing operation parameters to minimize the dispersion of WDM signals fed to FES 250. Ideally, processor 230 acts to render the polarity of the dispersion detected by DD 240 undetermined because the magnitude of the dispersion present would be smaller than the smallest magnitude of dispersion that can be detected by DD 240.

Furthermore, processor 230 controls the selection operations performed by FES 250 through control link 275. Alternatively, FES 250 could perform independently the selection operations and provide processor 230 with information identifying which FES input signal has been selected.

In summary, dispersion discrimination and compensation (DDC) subsystem 200 operates as a "null-seeker" implemented through a feedback loop. More precisely, DDC subsystem 200 is an active closed loop control system, the purpose of which is to drive the residual dispersion present in its ouput signals to a level equivalent to the sensitivity threshold of DD 240. The basic principle of operation is to regard the polarity and, optionally, the magnitude, of the dispersion discriminator (DD) 240 to be a measurement of the error component in a closed loop control system. The setting of the CADEs 220 is the variable allowing this error to be "nulled-out" to the point where the output from the DD 240 is balanced (no detectable error).

In operation, WDM signals enter each of CADEs 220 through respective CADE input fibers 260. Compensated WDM signals exit each of CADEs 220 through output fibers 222 and are tapped by directional couplers 245 to provide a sample component of the partially (or wholly) corrected optical signal, which is fed via FES 250 to DD 240. Hence, DD 240 acts as an error detector, detecting residual uncompensated dispersion and provides the information for the processor to act to refine the settings of the CADEs 220. Therefore, the couplers 245, FES 250, DD 240 and processor 230 are used in the manner described herein above to control CADEs 220 so that the amount of dispersion present in the compensated WDM signals is minimized.

In one embodiment, a bidirectional link 280 connects processor 230 with a switch controller 210, which can be switch controller 160 if the photonic switch 205 used is photonic switch 100 of FIG. 1. Bidirectional link 280 allows processor 230 to report to switch controller 210 any input optical fibers 120 for which appropriate dispersion compensation could not be provided by CADEs 220. In that case, diagnostic procedures concerning the failure of the dispersion compensation could be undertaken by processor 230 or the failure could be reported to a technician. Also, information concerning which of the input optical fibers 120 carry active optical signals can be provided to processor 230 by switch controller 210 so that the corresponding CADEs can be ignored by processor 230. It should be understood that two unidirectional links may be used.

Figure 3:
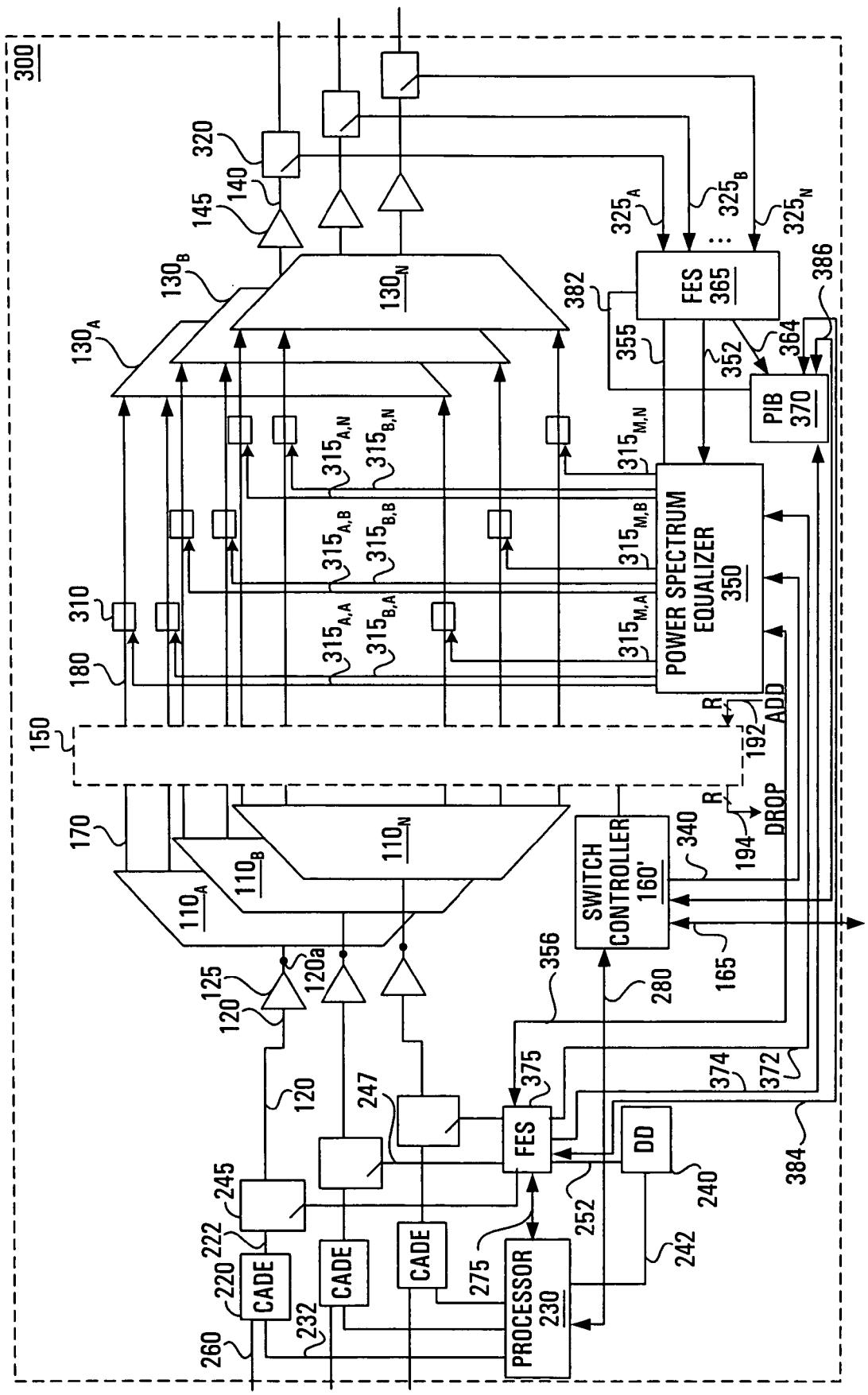
FIG. 3 shows in block diagram form a photonic switch providing dispersion discrimination and compensation functionality, in accordance with another embodiment of the present invention.

With reference to FIG. 3, there is shown a photonic switch 300 with DDC functionality, according to an embodiment of the present invention. Photonic switch 300 resembles the photonic switch 100 of FIG. 1 in that it retains the basic structure including the WDD devices $110_A$–$110_N$, the WDM devices $130_A$–$130_N$ and the photonic switch core 150.

Photonic switch 300 further comprises a DDC subsystem similar to DDC subsystem 200, as well as a power equalization subsystem for equalizing the power contained in each optical carrier of the output WDM signals exiting switch 300 through output optical fibers 140 and a path integrity verification subsystem for ensuring that switch 300 performs appropriate switching functions.

To that effect, photonic switch 300 comprises a plurality (M×N) of variable optical intensity controllers (VOICs) 310 respectively positioned in each of the demuxed switched optical paths 180. Thus, each of the VOICs 310 is associated with a respective switched individual optical carrier signal that emerges from the photonic switch core 150 along a respective one of the demuxed switched optical paths 180.

The VOICs 310 are used for providing intensity control in the form of either attenuation or amplification. Thus, each of the VOICs 310 can be either a variable optical attenuator or a variable optical amplifier, depending on operational requirements. The range of intensity control (i.e., attenuation or gain) required of an individual VOIC is typically expected to be on the order of 8 decibels (dB) or less, although it is within the scope of the invention to provide any required dynamic range of attenuation or gain.

It is convenient to view the VOICs 310 as forming an array of size M×N where, it is recalled, N is the number of WDM devices $130_A$–$130_N$ and M is the number of wavelengths handled by each WDM device (which is also the number of optical switch matrices $150_A$–$150_M$ in the photonic switch core 150). Typical values for M are 32 and above, while typical values for N are 4 and above. However, it should be understood that the invention is not subject to any limitation on M or N.

Each of the VOICs 310 has a control port for receiving a respective intensity control signal along a respective one of a plurality of intensity control lines generally indicated by the reference numeral 315. The intensity control signals are derived from a power spectrum equalization control system which is described in details below. Each such intensity control line carries an intensity control signal indicative of a desired amount of attenuation or gain to be applied by the respective VOICs 310. The intensity control line leading to the VOIC corresponding to the $J^{th}$ optical switch matrix $150_J$ and the $K^{th}$ WDM device $130_K$ can be denoted $315_{J,K}$, where $J \in \{A, B, \ldots, M\}$ and $K \in \{A, B, \ldots, N\}$.

With continued reference to FIG. 3, photonic switch 300 further comprises a plurality (N) of directional couplers 320, each of which intercepts the optical path of a respective one of the N output optical fibers 140. It is noted that the number of couplers 320 is equal to the number of output optical fibers 140, which is M times less than the total number of demuxed switched optical paths 180.

Photonic switch 300 further comprises a power spectrum equalization control system (hereinafter simply referred to as an "equalizer") 350 which is placed between the FES 365 and the VOICs 310 and which communicates with a switch controller 160' via a communication link 340. The switch controller 160' is similar to the switch controller 160 in FIG. 1 with the addition that it can provide connection map information to equalizer 350 through communication link 340. Like switch controller 160 of FIG. 1, switch controller 160' communicates with the outside world through control link 165. Further details concerning controller 160' can be found in above-referenced U.S. patent application Ser. No. 09/580,495.

The equalizer 350 is fed sample measurements from a FES 365 through an optical path 352. FES 365 is itself connected to each of the N couplers 320 by a respective one of a plurality of optical paths $325_A$–$325_N$, where optical path $325_A$ carries a tapped WDM optical signal from WDM device $130_A$, optical path $325_B$ carries a tapped WDM optical signal from WDM device $130_B$, and so on. The function of FES 365 is similar to the function of FES 240 in that it is used to select individual optical signals from a plurality of optical signals propagated through a plurality of WDM optical signal paths. However, FES 365 is connected to two optical fibers 352 and 364 which can each propagate separately selected optical signals, each carrying a single data channel. The equalizer 350 is further connected to the control port of each of the M×N VOICs 310 by a respective one of the plurality of intensity control lines 315.

Equalizer 350 is further connected to a second FES 375 through an optical path 372. FES 375, similarly to FES 365, selects individual optical signals from a plurality of WDM signals propagated on a plurality of optical paths. However, FES 375 can select three individual optical signals, each one to be propagated through one of optical paths 252, 374 and 372.

The optical signal provided to equalizer 350 by FES 375 can be used to determine the quality of the WDM signals fed to photonic switch 300. Quality characteristics to be determined can include, but are not limited to, signal intensity and signal-to-noise ratio. Quality characteristics of signals selected by FES 375 can then be transmitted to switch controller 160' through communication link 340 for further consideration.

It should be acknowledged that various well known courses of action can be taken depending on the quality characteristics presented by the signals selected by FES 375.

The equalizer 350 may have a variety of internal configurations, some of which are described in above-referenced U.S. patent application Ser. No. 09/580,495. For example, signals selected by FES 365 and 375 can be transmitted to a photo-detector or photo-detector array to measure the power of each optical carrier present in output optical fibers 140. These measurements can then be passed to a power spectrum analyzer which can collate, correlate and process the results. Using that information, the equalizer 350 controls the amount of gain or attenuation to be applied by each of the VOICs 310 in a closed loop negative feedback control loop which aims to equalize the power contained in the signals outgoing from VOICs 310. To select which optical signals are selected among the plurality of WDM signals entering FES 365 and FES 375, equalizer 350 sends selection information to FES 365 through control link 355 and to FES 375 through control link 356.

Photonic switch 300 further comprises a Path Integrity Block (PIB) 370, which is connected to FES 365 and FES 375 respectively through optical paths 364 and 374. In one embodiment, PIB 370 uses the correlation between optical signals propagated on optical paths 364 and 374 to assess the proper working of photonic switch 300. The optical signals to be selected and propagated on optical paths 364 and 374 are selected using control information transmitted to FES 365 and 375 through respective control links 382 and 384. Furthermore, PIB 370 receives connection map information from switch controller 160' through communication link 386, which can also be used to transmit integrity information to switch controller 160'.

An embodiment of PIB 370 is described in detail in above-referenced co-pending U.S. patent application Ser. No. 09/742,232. However, those skilled in the art will recognize that any PIB 370 having the functionality described herein above could be used.

Photonic switch 300 provides the use of FES 375 in a feedback loop comprising CADEs 220, a FES 375, a DD 240 and a processor 230. The operation of this feedback loop is similar to the operation of the feedback loop comprising CADEs 220, FES 250, DD 240 and processor 230, presented herein above with respect to the description of the embodiment illustrated in FIG. 2. It is noted that FES 375, used to select individual optical signals for power spectrum and path integrity verification, is also used to perform the functions of FES 250 previously described. It should be appreciated that this embodiment advantageously keeps the number of distinct components in the DDC subsystem-switch combination at a minimum, with many advantages, including reduction of cost and complexity level.

It should be appreciated that either or both of the equalizer 350 and PIB 370 could be omitted from photonic switch 300 without departing from the spirit of the invention.

Figure 4:
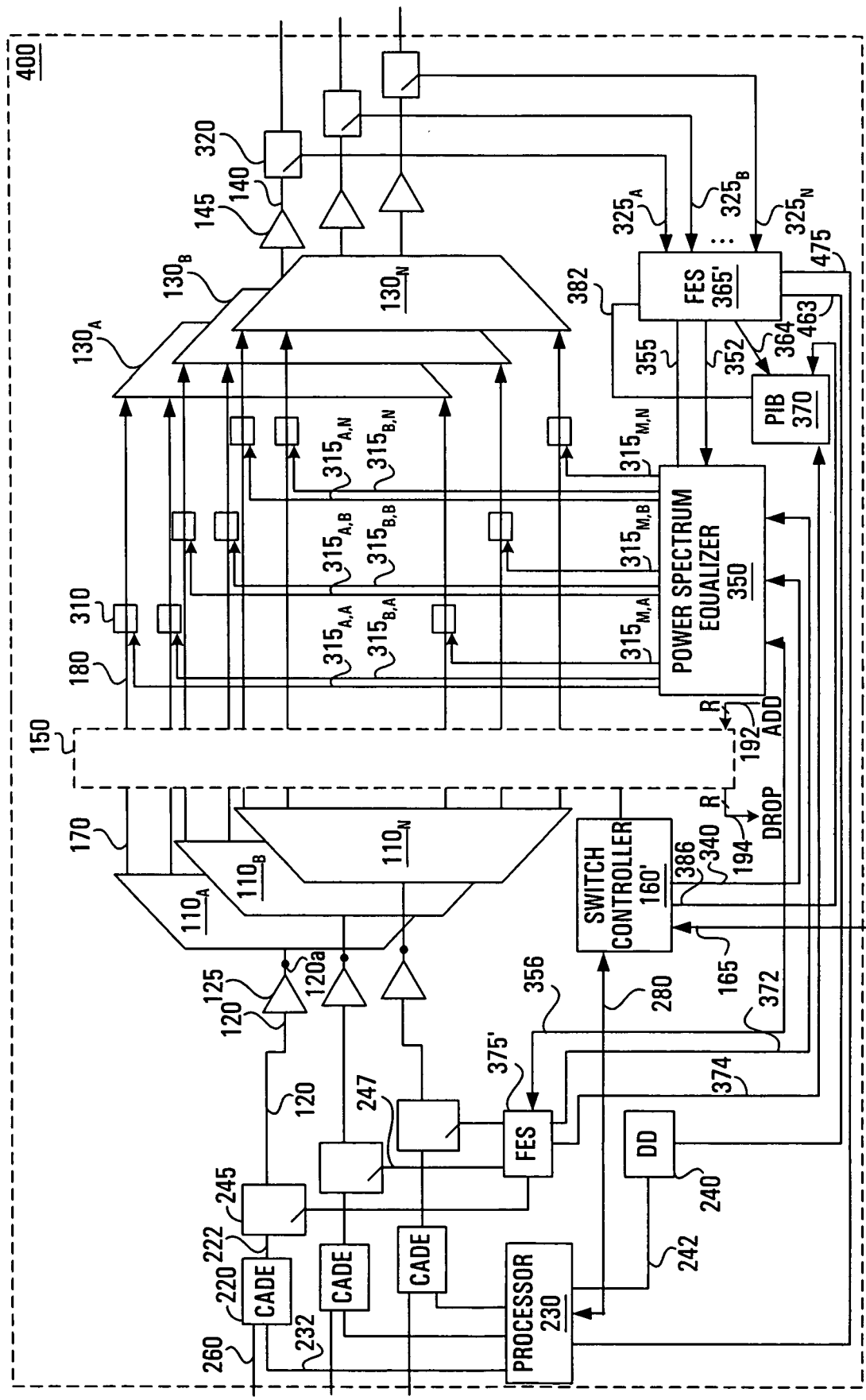
FIG. 4 shows in block diagram form another photonic switch providing dispersion discrimination and compensation functionality.

Alternatively, as shown in FIG. 4, an output-side FES 365' can be used instead of FES 375 to select an optical signal to be fed to DD 240. The structure of photonic switch 400 is similar to the structure of photonic switch 300 previously described. However, in photonic switch 400, DD 240 is connected to FES 365' through optical path 463. FES 375' performs functions similar to FES 375 except that it is not linked to a DD. Therefore, it is used to select only two optical signals. Since processor 230', which controls the amount of dispersion compensation applied by CADEs 220, now receives information about the dispersion present in optical signals going out of the photonic switch through output optical fibers 140, a connection map describing the connections between input optical fibers 120 and output optical fibers 140 effected by switching core 150 must be transmitted to processor 230'. Therefore, in this embodiment, link 280 between processor 230' and switch controller 160' is not optional and passes connection map information. Using the output-side FES 365' to perform dispersion discrimination and compensation as well as power spectrum equalization allows, if desired, to use a single hardware component to control both processes, each one being performed by a separate software module.

Furthermore, control link 275 which was used in photonic switch 300 to provide selection information to FES 375 is replaced in switch 400 by control link 475 performing the same function with respect to switch 365'.

Figure 5:
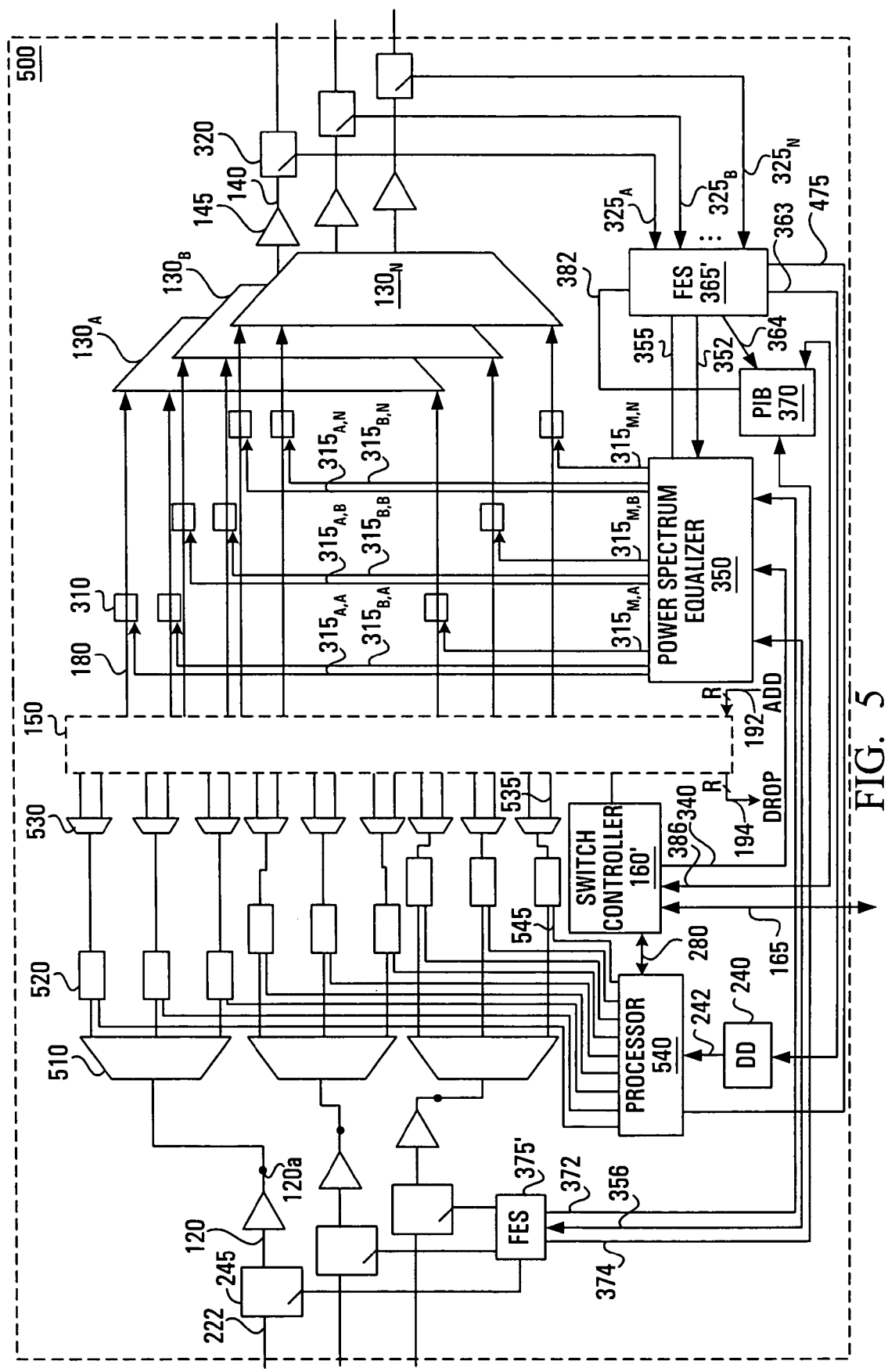
FIG. 5 shows in block diagram form a photonic switch providing dispersion discrimination and compensation functionality, wherein optical signals are band-demultiplexed before dispersion compensation is provided.

With reference to FIG. 5, there is shown a photonic switch 500 having a structure similar to the one of photonic switch 400. However, wavelength division demultiplexing (WDD) devices $110_A$–$110_N$ of photonic switch 400 are replaced by N broadband/banded 1:F wavelength division demultiplexing (BBWDD) devices 510 and N×F WDD devices 530. The banded demultiplexing step is performed so that dispersion compensation can be effected on WDM signals having a bandwidth smaller than the bandwidth of each of the N input WDM signals.

This allows a single-point, best-fit approximation of a single variable CADE to be replaced by an N-point, best-fit approximation, one point for each of N sub-bands. This yields improved cancellation across the entire optical bandwidth of the node, if there are any differences between the dispersion properties of the incoming (pre-compensation) optical paths as a function of optical frequency and the properties of the CADE as a function of optical frequency.

On the input side of the photonic switch 500, each of the N BBWDD devices 510 accepts a respective input WDM signal on a respective one of the input optical fibers 120. Each BBWDD device 510 demultiplexes the input WDM signal it receives in F output WDM signals, each output WDM signal having a narrower bandwidth than the input WDM signal from which it was demultiplexed. Preferably, each output WDM signal has a bandwidth which is approximately M/F times narrower than the bandwidth of the corresponding input WDM signal, M being the number of data channels in the corresponding input WDM signal.

Each of these N×F output WDM signals is fed to one of the N×F CADEs 520 through a corresponding optical path from the set of N×F optical paths 515. Each of the CADEs 520 operates similarly to each of CADEs 220. However, those skilled in the art will recognize that each CADE 520 may present less stringent performance requirements than CADEs 220 because of the smaller bandwidth of the signal to be dispersion compensated.

CADEs 520 transmit dispersion compensated WDM signals to photonic switch core 150 through a set of N×F optical paths 525 connected to a set of N×F WDD devices 530, the WDD devices 530 transmitting demultiplexed signals, each comprising a single data channel, to an appropriate optical switch matrix among the set of optical switch matrices $150_A$–$150_M$ on a per-wavelength basis. This latter transmission is effected through a set of optical paths 535.

In summary, WDM signals incoming through input optical fibers 120 are band-demultiplexed, dispersion corrected and channel-demultiplexed before being fed to the photonic switch core 150.

CADEs 520 are controlled by a processor 540 having a function similar to processor 230 of photonic switch 400 in that it controls the amount of dispersion compensation to be provided by of a set of CADEs. Since the number of CADEs to control is equal to N×F in photonic switch 500, processor 540 is linked to all CADEs 520 though a set of N×F communication links 545.

Aside from the differences described above, the other components of photonic switch 500 operate in substantially the same way as they do in photonic switch 400.

Figure 6:
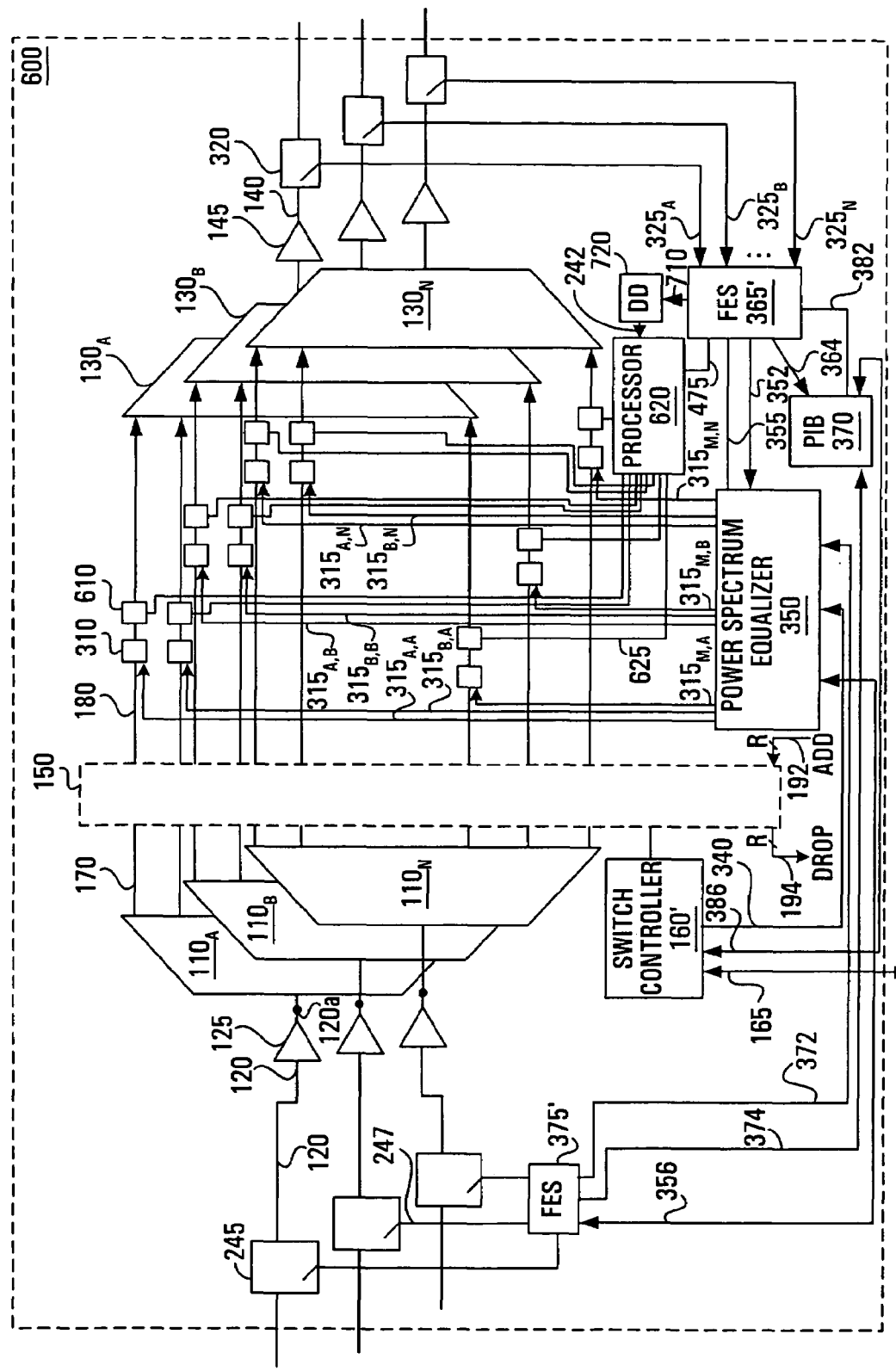
FIG. 6 shows in block diagram form a photonic switch providing dispersion discrimination and compensation functionality to individual optical signals after these are switched.

In a further embodiment shown in FIG. 6, dispersion compensation is effected separately for each wavelength in photonic switch 600, which has a structure very similar to photonic switch 400. A difference with respect to photonic switch 400 resides in that CADEs 220 of photonic switch 400 are replaced in photonic switch 600 by M×N CADEs 610. CADEs 610 are located between switch core 150 and WDM devices 130A–130N. Preferably, CADEs 610 are located after VOICs 310. Alternatively, CADEs 610 are located prior to VOICs 310. Also, CADEs 610 and VOICs 310 can be placed between the WDD devices $110_A$–$110_N$ and photonic switch core 150. Each of CADEs 610 performs dispersion compensation on an optical signal which has a bandwidth that is narrower than the bandwidth of the optical signals compensated by each of CADEs 220. Therefore, each of the M×N CADEs 610 may present lower performance requirements than each of the N CADEs 220. Furthermore, since per-wavelength dispersion compensation is effected in photonic switch 600, dispersion compensation depends on a single parameter and can therefore be performed more accurately than in the other previously described embodiments wherein there can be less parameters to adjust for each CADE than there are data channels to compensate for dispersion. However, a greater number of CADEs 610 is required.

Still with reference to FIG. 6, processor 620, which performs functions similar to those of processor 230 of photonic switch 400, is now connected to each CADE 620 through one control link from the set of N×M control links 625.

The other components of photonic switch 600 operate substantially in the same way as they do in photonic switch 400.

Figure 7:
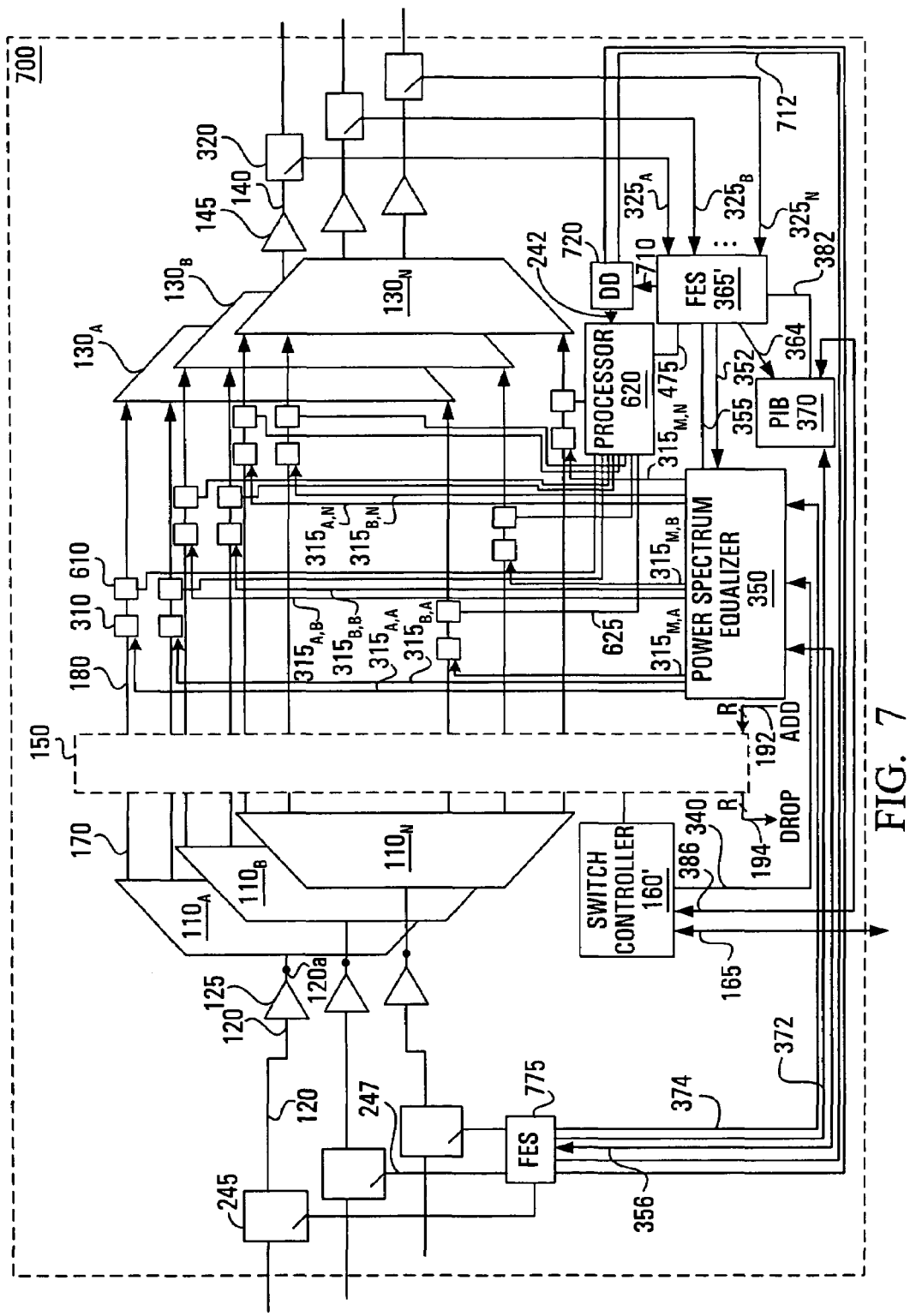
FIG. 7 shows in block diagram form a photonic switch providing dispersion discrimination and compensation functionality to individual optical signals after these are switched, wherein fault-detection functionality is provided for the subsystem providing dispersion discrimination and compensation functionality.

A further embodiment of the invention is presented in FIG. 7, wherein photonic switch 700 is substantially identical in structure to photonic switch 600, except that fault-detection functionality is provided for the subsystem providing dispersion discrimination and compensation functionality.

To this end, FES 375 is replaced by FES 775, which is linked through optical path 712 to DD 720. The optical signal to be selected for propagation through optical path 712 is specified by DD 720 on a control link 770. DD 720 performs functions similar to DD 240, except that it accepts optical inputs from two different optical paths 710 and 712. Furthermore, DD 720 may additionally have the capability to assess the magnitude of the dispersion of the optical signal incoming from optical path 712. A way to perform such dispersion magnitude assessment is described in above-referenced co-pending U.S. patent application Ser No. 09/842,236. FES 775 also performs functions similar to FES 375 except that it can select three data channels to be separated and outputted through optical paths 373, 374 and 712. It should be appreciated that FES 375 and DD 240 can easily be modified into FES 775 and DD 720.

Processor 620 can therefore assess the amount of dispersion present in the input WDM signals transmitted through input optical fibers 120. Such an assessment can be useful, for example, to determine whether failure to correct for dispersion through CADEs 610 is caused by the failure of the DDC subsystem (CADEs 610, DD 720, processor 620) or by a dispersion of the input signal from paths 120 that is outside of the dispersion compensation capabilities of the DDC subsystem.

While specific embodiments of the present invention have been described and illustrated, it will be apparent to those skilled in the art that still further modifications and variations can be made without departing from the scope of the invention as defined in the appended claims. A readily recognized variation would be to replace photonic switch 205 by an electrical switch comprising equipment for converting input optical signals to electrical signals.

We claim:

1. A dispersion discrimination and compensation system, comprising:
    a plurality of anti-dispersive elements, each having an input for receiving a respective first multi-channel optical signal and an output for providing a respective second multi-channel optical signal, each of said plurality of anti-dispersive element being adapted to apply dispersion compensation to the respective first multi-channel optical signal in response to receipt of a respective first control signal, thereby to produce the respective second multi-channel optical signal;
    a front end selector (FES) having an FES output and also having a plurality of FES inputs each connected to the output of a respective one of said plurality of anti-dispersive elements, each FES input accepting a respective one of the plurality of second multi-channel optical signals, said FES being adapted to select an FES input from the plurality of FES inputs, to select a single channel in the optical signal present at the selected FES input and to provide the selected channel to the FES output;
    a dispersion discriminator connected to the FES output and adapted to determine a dispersion characteristic of the optical signal present at the FES output, said dispersion discriminator being further adapted to generate a second control signal indicative of the dispersion characteristic of the optical signal present at the FES output; and
    a processor connected to said dispersion discriminator and to said plurality of anti-dispersive elements, said processor being adapted to generate, as a function of the second control signal, the first control signal for the anti-dispersive element whose output is connected to the selected FES input, thereby to exert feedback control of the dispersion compensation applied by that anti-dispersive element.

2. A system as defined in claim 1, wherein said processor is further connected to said FES and wherein said processor is further adapted to control selection of the FES input and selection of the channel in the optical signal present at the selected FES input.

3. A system as defined in claim 1, wherein said processor is further connected to said FES and wherein said processor is further adapted to receive information signals from the FES containing information about which FES input is selected by said FES and which channel is selected in the optical signal present at the selected FES input.

4. A system as defined in claim 1, further comprising:
    a plurality of optical splitters connected to said FES and each connected to the output of a respective anti-dispersive element from said plurality anti-dispersive elements, for tapping the plurality of second optical signals and feeding them to said FES.

5. A method of compensating for dispersion present in multi-channel optical signals, comprising:
    applying an amount of dispersion compensation to a first plurality of multi-channel optical signals, thereby to produce a second plurality of multi-channel optical signals;
    receiving said second plurality of multi-channel optical signals respectively at a plurality of inputs;
    selecting a multi-channel optical signal from said second plurality of multi-channel optical signals;
    selecting a single channel from the selected multi-channel optical signal of the second plurality of multi-channel optical signals;
    determining a dispersion characteristic of the selected channel;
    outputting from a common output, said dispersion characteristic of the selected channel; and
    on the basis of the determined dispersion characteristic of the selected channel, regulating the amount of dispersion compensation applied to a multi-channel optical signal in the first plurality of multi-channel optical signal that corresponds to the selected second multi-channel optical signal.

6. A method as defined in claim 5, wherein determining a dispersion characteristic of die selected channel comprises determining a polarity of chromatic dispersion present in the selected channel.

7. A method as defined in claim 5, wherein determining a dispersion characteristic of the selected channel comprises determining a magnitude of chromatic dispersion present in the selected channel.

8. A method as defined in claim 5, wherein determining a dispersion characteristic of the selected channel comprises determining a polarity of polarization dispersion present in the selected channel.

9. A method as defined in claim 5, wherein determining a dispersion characteristic of the selected channel comprises determining a magnitude of polarization dispersion present in the selected channel.

10. A switch for optical signals, comprising:
a plurality of optical input ports for accepting a first plurality of optical signals;
a plurality of optical output ports for providing a second plurality of optical signals;
a switch matrix connecting said plurality of optical input ports to said plurality of optical output ports; and
a dispersion discrimination and compensation subsystem adapted to provide variable dispersion compensation to the first plurality of optical signals, thereby producing the second plurality of optical signals, wherein the dispersion compensation applied is regulated through a feedback loop,
wherein the first and second plurality of optical signals are composed of multi-channel optical signals and wherein said dispersion discrimination and compensation subsystem comprises:
a plurality of anti-dispersive elements, each having an input for receiving a respective first multi-channel optical signal from among the first plurality of optical signals and an output for providing a respective second multi-channel optical signal from among the second plurality of optical signals, each said anti-dispersive clement being adapted to apply dispersion compensation to the respective first multi-channel optical signal in response to receipt of a respective first control signal, thereby to produce the respective second multi-channel optical signal;
a front end selector (FES) having an FES output and also having a plurality of FES inputs each connected tote output of a respective one of the plurality of anti-dispersive elements, each FES input accepting a respective one of the plurality of second multi-channel optical signals, said FES being adapted to select an FES input from the plurality of FES inputs, to select a single channel in the optical signal present at the selected FES input and to provide the selected channel to the FES output;
a dispersion discriminator connected to the FES output and adapted to determine a dispersion characteristic of the optical signal present at the FES output, said dispersion discriminator being further adapted to generate a second control signal indicative of the dispersion characteristic of the optical signal present at the FES output and
a processor connected to the dispersion discriminator and to the plurality of anti-dispersive elements, said processor being adapted to generate, as a function of the second control signal, the first control signal for the anti-dispersive element whose output is connected to the selected FES input, thereby to exert feedback control of the dispersion compensation applied by that anti-dispersive element.

11. A switch as defined in claim 10, wherein each of said plurality of anti-dispersive elements is disposed between one of said plurality of input ports and said switch matrix.

12. A switch as defined in claim 10, wherein each of said plurality of anti-dispersive elements is disposed between said switch matrix and one of said plurality of output ports.

13. A switch as defined in claim 10, further comprising a switch controller connected to the processor by a communication link, said switch controller being adapted to provide connection map information to said processor through said communication link.

14. A switch as defined in claim 13, wherein said processor is adapted to detect a failure to provide dispersion compensation by said switch and wherein said processor is adapted to inform said switch controller of the failure through said communication link.

15. A switch as defined in claim 10, wherein said FES is adapted to select an FES input from the plurality of FES inputs and to select a single channel in the optical signal present at the selected FES input according to instructions contained in a third control signal provided by said processor.

16. A switch as defined in claim 10, further comprising a path integrity verification subsystem comprising:
a first verification optical link connected between one of said plurality of optical input ports and said switch matrix;
a second verification optical link connected between one of said plurality of optical input ports and said switch matrix; and
a processor connected to said first and a second verification optical links for comparing a first and a second verification signals to evaluate a switching function of said switch matrix, the first and a second verification signals being provided respectively by said first and second verification optical links.

17. A switch as defined in claim 10, wherein:
each of said first plurality of optical signals is a WDM signal;
said switch matrix comprises a plurality of per-wavelength switching planes; and
said switch further comprises:
a plurality of wavelength division demultiplexing (WDD) devices, each connected to a respective one of said optical inputs, each of said WDD devices providing a plurality of demultiplexed optical signals to said plurality of per wavelength switching planes;
a plurality of wavelength division multiplexing (WDM) devices, each one connected to one of said optical outputs, each WDM devices accepting a plurality of switched optical signals from said per-wavelength switching planes.

18. A switch as defined in claim 17, further comprising a plurality of variable optical intensity controllers (VOICs), wherein the second plurality of optical signals comprises at least one multi-channel output signal comprising a plurality of data channel and wherein said switch further comprises a power equalizing system adapted to provide equalization of optical power of the plurality of data channels though the plurality of VOICs, the plurality of VOICs being conaceted between said switch matrix and said plurality of WDM devices.

19. A switch for optical signals, comprising:
a plurality of optical input ports for accenting a first plurality of optical signals;
a plurality of optical output ports for providing a second plurality of optical signals;
a switch matrix connecting said plurality of optical input ports to said plurality of optical output ports; and
a dispersion discrimination and compensation subsystem adapted to provide variable dispersion compensation to the first plurality of optical signals, thereby producing the second plurality of optical signals, wherein the dispersion compensation applied is regulated through a feedback loop; wherein:
each of said first plurality of optical signals is a WDM signal;
said switch matrix comprises a plurality of per-wavelength switching planes; and
said switch further comprises:
a plurality of wavelength division demultiplexing (WDD) devices, each connected to a respective one of said optical inputs, each of said WDD devices providing a plurality of demultiplexed optical signals to said plurality of per-wavelength switching planes;
a plurality of wavelength division multiplexing (WDM) devices, each one connected to one of said optical outputs, each WDM devices accepting a plurality of switched optical signals from said per-wavelength switching planes,
wherein said dispersion discrimination and compensation subsystem comprises:
a plurality of anti-dispersive elements, each having an input for receiving a respective first single-channel optical signal outgoing from a respective one of said per-wavelength switching plane (each being one of the switched optical signals), and an output for providing a respective second single-channel optical signal to one of said WDM devices, each said anti-dispersive element being adapted to apply dispersion compensation to the respective first single-channel optical signal in response to receipt of a respective first control signal, thereby to produce the respective second single-channel optical signal;
a first front end selector (FES) having a first FES output and also having a plurality of first FES inputs each connected to the output of a respective one of the plurality of WDM devices and each receiving a first multi-channel optical signal, said first FES being adapted to select a first FES input from the plurality of first FES inputs, to select a third single channel in the first multi-channel optical signal present at the selected first FES input and to provide the third single channel to the first FES output;
a dispersion discriminator connected to the first FES output and adapted to determine a first dispersion characteristic of the optical signal present at the first FES output, said dispersion discriminator being further adapted to generate a second control signal indicative of the first dispersion characteristic of the third single channel; and
a processor connected to the dispersion discriminator and to the plurality of anti-dispersive elements, said processor being adapted to generate, as a function of the second control signal, the first control signal for the anti-dispersive element whose output contains the third single channel, thereby to exert feedback control of the dispersion compensation applied by that anti-dispersive element.

20. A switch as defined in claim 19, further comprising a switch controller connected to the processor by a communication link, said switch controller being adapted to provide connection map information to said processor through said communication link.

21. A switch as defined in claim 20, wherein:
said dispersion discrimination and compensation subsystem further comprises a second FES having a second FES output and also having a plurality of second FES inputs each connected to said plurality of optical input ports, each second FES input accepting a respective one of the plurality of first multi-channel optical signals, said second FES being adapted to select a second FES input from the plurality of second FES inputs, to select a fourth single channel in the optical signal present at the selected second FES input and to provide the fourth selected channel to the second FES output;
said DD is further connected to the second FES output and adapted to determine a second dispersion characteristic of the optical signal present at the second FES output, said dispersion discriminator being further adapted to generate a fourth control signal indicative of the second dispersion characteristic of the optical signal present at the second FES output; and
said processor is adapted to receive said fourth control signal, to detect a failure to provide appropriate dispersion compensation by said switch using said second and fourth control signals, and to inform said switch controller of the failure through said communication link.

22. A switch as defined in claim 19, wherein said first FES is adapted to select an FES input from the plurality of FES inputs and to select the third single channel in the optical signal present at the selected FES input according to instructions contained in a third control signal provided by said processor.

23. A switch for optical signals, comprising:
a plurality of optical input ports for accepting first plurality of optical signals;
a plurality of optical output ports for providing a second plurality of optical signals;
a switch matrix connecting said plurality of optical input ports to said plurality of optical output ports; and
a dispersion discrimination and compensation subsystem adapted to provide variable dispersion compensation to the first plurality of optical signals, thereby producing the second plurality of optical signals, wherein the dispersion compensation applied is regulated through a feedback loop, wherein:
each of said first plurality of optical signals is a WDM signal; said switch matrix comprises a plurality of per-wavelength switching planes; and said switch further comprises:
a plurality of banded wavelength division demultiplexing (BWD) devices, each one connected to one of said optical input ports,
a plurality of wavelength division demultiplexing (WDD) devices, each one connected to one of said BWD devices and each one providing a plurality of fully demultiplexed optical signals to at least two per-wavelength switching planes of said plurality of per-wavelength switching planes;
a plurality of wavelength division demultiplexing (WDD) devices, each one connected to one of said BWD devices and each one providing a plurality of fully demultiplexed optical signals to at least two per-wavelength switching planes of said plurality of per-wavelength switching planes;

a plurality of wavelength division multiplexing (WDM) devices, each one connected to one of said optical output ports, each WDM device accepting a plurality of switched optical signals from said per-wavelength switching planes to produce a respective one of a first plurality of multi-channel optical signals, wherein said dispersion discrimination and compensation subsystem comprises:

a plurality of antidispersive elements, each having an input for receiving a respective second multi-channel optical signal outgoing from one of said BWD devices and an output for providing a respective third multi-channel optical signal to one of said WDD devices, each said anti-dispersive element being adapted to apply dispersion compensation to the respective second multi-channel optical signal in response to receipt of a respective first control signal, thereby to produce the respective third multi-channel optical signal;

a front end selector (FES) having a FES output and also having a plurality of FES inputs each connected to the output of a respective one of the plurality of WDM devices, each FES input accepting a respective one of the plurality of first multi-channel optical signals, said FES being adapted to select a FES input from the plurality of FES inputs, to select a single channel in the optical signal present at the selected FES input and to provide the selected channel to the FES output;

a dispersion discriminator connected to the FES output and adapted to determine a dispersion characteristic of the optical signal present at the FES output said dispersion discriminator being further adapted to generate a second control signal indicative of the dispersion characteristic of the optical signal present at the FES output; and a processor connected to the dispersion discriminator and to the plurality of anti-dispersive elements, said processor being adapted to generate, as a function of the second control signal, the first control signal for the anti-dispersive element whose output contains the optical signal present at the first FES output, thereby to exert feedback control of the dispersion compensation applied by that anti-dispersive element.

* * * * *